United States Patent Office 3,824,206
Patented July 16, 1974

3,824,206
RUBBER TREAD COMPOSITIONS
Krishna C. Baranwal, Stow, and Richard G. Bauman, Berea, Ohio, assignors to The B. F. Goodrich Company, New York, N.Y.
No Drawing. Filed Mar. 8, 1972, Ser. No. 232,908
Int. Cl. C08d 13/22
U.S. Cl. 260—33.6 AQ        4 Claims

ABSTRACT OF THE DISCLOSURE

Rubber compositions which contain reinforcing pigments such as carbon black, and which are especially suitable for tire treads, are made in an unexpectedly high quality and low cost from synthetic rubber of very high molecular weight and a very narrow range of molecular weight dispersed in a liquid medium, by mixing the rubber in liquid form with an extending oil in a quantity about equal to or greater than the quantity of rubber, the reinforcing pigment, and all other ingredients, removing the dispersing medium, and producing essentially no permanent deformation of the dry rubber except that necessary to shape it to the form of the final product.

BACKGROUND OF THE INVENTION

It was disclosed in the Zimmerli & Semon Pat. 1,942,853 in 1934 that large quantities of oil would be used in rubber compositions if the rubber is a tough variety and if the oil is taken up by the rubber essentially without mastication or physical breakdown of the rubber. During the wartime shortage of rubber in the early forties, this knowledge was applied to the compounding of the tough German synthetic rubber by soaking unmasticated crumb rubber in oil before adding the other ingredients for making a tire tread mix. More recently, the Pfau, Swart & Weinstock Pat. 2,964,083, filed in 1950 and issued in 1960, proposed that large quantities of oil, or of oil and reinforcing pigments together, be mixed with varieties of synthetic rubber before any substantial mechanical working of the rubber, particularly in the working up of synthetic latex, but also in compounding of dry rubber by mechanical mixing, as well as compounding of solution polymers such as the so-called Alfin rubbers.

It is now known that if raw rubber in dry form is to be easily workable, for admixture of the ingredients which bring about vulcanization or reinforcement, and for shaping of the mix, the rubber should contain essentially unbranched molecular chains of widely varying lengths. The short chain molecules contribute little to the strength of the product, but are important for ease of mixing and shaping. The very long chains contribute most to strength and fatigue resistance of the final product, but too high a proportion of long chains makes the rubber difficult to process. Moreover, very long molecular chains tend to be ruptured during the mechanical working which is essential for proper mixing and shaping in conventional rubber manufacturing operations, so that little or no benefit results from the presence of the longest chain molecules.

It is known that a substantial saving can be realized by preparing raw rubber so as to contain almost no short chains, but predominantly medium length molecular chains, and not too many very long chains, and adding a cheap oil in sufficient volume to impart the desired processing properties which would otherwise have resulted from presence of short polymer molecules. This assures adequate ease of mixing and shaping in preparation for vulcanization. The saving results from the fact that the processing oils are generally petroleum fractions obtained by simple and cheap physical separation, whereas short polymer molecules are made from basic materials such as petroleum hydrocarbons by an expensive series of complex reactions and separations followed by a carefully controlled polymerization operation, so that the oils are obtainable at a far lower cost than that of any part of the rubber polymer.

Consequently, a major proportion of all of the synthetic rubber produced is now marketed in the form of oil or oil-black masterbatches, in which the rubber is polymerized to a moderately high average molecular weight, but still contains predominantly a wide range of sizes of medium length chain molecules and almost no very high molecular weight, long chain, molecules. The oil is typically added to the rubber while it is still in liquid form, either as a latex or a solution, depending on the polymerization method used. If it is desired, the carbon black used as a reinforcing pigment is added at the same time. The rubber is then converted to solid raw rubber, by coagulation if it is latex, or by evaporation of solvent if it is a solution. The raw rubber containing oil, or oil plus reinforcing pigments is then shipped to rubber factories where it is further mixed with vulcanizing materials and other needed ingredients by conventional mechanical working of the plastic unvulcanized rubber in an internal mixer or on a two-roll mixing mill, followed by shaping and vulcanization.

Raw rubbers now available to manufacturers of rubber products such as tires, include natural tree rubber (essentially cis 1,4 polyisoprene), and synthetic polymers and copolymers made either in latex form or in solution, from various monomers and mixtures of monomers. The synthetic polymers which are considered to be especially suitable for making tires are latex copolymers of butadiene and styrene (SBR); solution polymers of butadiene or of isoprene; solution copolymers of butadiene and styrene; solution copolymers of isobutene with isoprene (butyl rubber); and solution terpolymers of ethylene, propylene, and a diene. These are supplied both as essentially uncompounded polymers (with no additives other than anti-oxidants and small quantities of residues of materials employed for polymerization), and as masterbatches with various grades of carbon black and with paraffinic, naphthenic, or aromatic oils. The following kinds of masterbatches have been supplied commercially for a number of years with "parts" meaning parts by weight added to 100 parts of polymer:

|  | Parts |
|---|---|
| Latex SBR with carbon black | 20 to 62.5 |
| Latex SBR with oils | 25 to 75 |
| Latex SBR with: | |
|    Carbon black | 40 to 100 |
|    And oils | 15 to 90 |
| Solution, poly-butadiene with oils | 14 to 50 |
| Solution, poly-butadiene with: | |
|    Carbon black | 80 to 90 |
|    And oils | 35 to 50 |
| Solution, poly-isoprene with oils | 25 |
| Solution, ethylene propylene rubber with oils | 33.5 to 100 |

Although higher proportions of oil than 100 parts in each 100 parts of polymer have been proposed repeatedly, practical experience has been that such high proportions of oil can be tolerated in high quality products only when added to an extremely high molecular weight polymer. Even then, quality tends to suffer because the mixing and shaping, which are essential steps in conventional processing, cause breakdown of the polymer by rupturing the long molecular chains of the polymer so that it ends up by being degraded to a medium molecular weight material, and the high quality expected to be obtained by starting with rubber of high molecular weight has not been achieved. Moreover, the processing of such highly oilextended, extremely high molecular weight polymers is difficult and tends to be slower and more expensive, so that much of the potential saving is offset by increased processing costs.

SUMMARY OF THE INVENTION

We have discovered that we can produce rubber compositions of increased strength and durability and can at the same time achieve substantial added savings in cost by using a particular combination of ingredients and procedures.

The principal ingredients are a special type of high molecular weight rubber, and high proportions of oil and reinforcing pigments, along with the usual vulcanizing and protective materials.

The principal procedural requirements are to add all ingredients, other than the rubber, to the rubber while the rubber is in a liquid condition, as a latex or solution, and to perform essentially all of the mixing by stirring all other ingredients into the liquid solution or suspension so as to avoid material breakdown of the molecular structure, followed by conversion to solid rubber, and shaping to its ultimate configuration with essentially no further mixing and preferably only the degree of deformation and working required for imparting the necessary shape to the rubber to produce the intended finished article.

The special type of high molecular weight rubber used in this invention, although not a new material, is very different from the commercial materials heretofore employed in actual manufacturing operations. This special type of rubber has an extremely high molecular weight and an extremely uniform molecular weight, that is, a narrow molecular weight distribution.

This type of rubber consists of almost unbranched polymer chains with a molecular weight preferably so high that the polymer cannot be mixed in a dry condition without breakdown resulting in a permanent degradation, which is evidenced in low values of properties of the final product, such as fatigue life and energy to break. While the average molecular weight can be expressed directly, and when so expressed is preferably of the order of a million or more, up to several million, different procedures for determining molecular weight result in somewhat different numerical values. For this reason, and also because Dilute Solution Viscosity (DSV) is measured by a rather simple and convenient procedure, we identify our materials by determining DSV, which is a direct function of molecular weight. The rubber used in this invention should have a DSV of 3.5 or higher, and preferably from about 5 to 9. However, rubber with a DSV somewhat lower than 3.5 can advantageously be used in this invention if the R value, explained in the next paragraph, is sufficiently low.

The other requirement is that the rubber should have an essentially uniform molecular weight, or narrow molecular weight distribution, which means that the length of the majority of the molecular chains should fall within a narrow range. This requirement is measured by the ratio of weight average molecular weight to number average molecular weight. When all molecules are the same size, these two figures will have the same value and their ratio will be 1. When the molecules of rubber are of various sizes, the difference between the two molecular weight figures, and therefore their ratio, is indicative of the spread in molecular weight of the rubber molecules. This ratio, designated by the leter R, is sometimes called polydispersity. Its value for commercial synthetic rubbers ranges from somewhat over 2 to as high as 10 or more for some of the highly plastic and easily workable materials. For this invention, R should be not over about 2.5 and should preferably be 1.5 or less, particularly if DSV of the rubber is on the low side of the useful range, as low as 3.5 or even as low as about 3.

The character of the rubber can be expressed by the statement that its DSV must be more than twice its polydispersity or R value and preferably 3 or more times its R value. Since R is always somewhat greater than 1, this means that the DSV must be considerably more than 2 and preferably 3.5 or higher, as explained above.

Synthetic rubbers of the type specified above can be made from various raw materials which produce polymers of different kinds. Thus, dienes such as butadiene, isoprene, piperylene, chlorobutadiene, and the like, may be polymerized alone or in admixture with each other or with minor proportions of vinyl or vinylidene compounds such as styrene, vinyl acetate, methyl methacrylate, vinyl pyridine, acrylic acid, acrylonitrile, and the like, either while emulsified in water so as to produce a polymer latex, or while dissolved in a volatile solvent so as to produce a solution. Isobutene may be polymerized with a small proportion of butadiene or isoprene to produce butyl rubber. Ethylene and propylene together with a diene may be polymerized to produce so-called EPDM rubber. Ethylene oxide alone or mixed with propylene oxide or epichlorohydrin, or tetrahydrofurane alone, may be polymerized to produce polyether rubbers. These are only a few of the known varieties of synthetic rubber, but are those presently considered to be most likely to be useful in the practice of this invention. The polymerization catalysts, dispersion media (water or solvent), reaction conditions, and finishing procedures to prepare them in the type specified above are well known but differ somewhat depending on the nature of the chosen monomer and the nature of the dispersion medium, whether water to produce latex or a solvent to produce a solution.

The oil which is to be mixed with the synthetic rubber should preferably be a petroleum oil because of availability in quantity at a low price, but may be any other type of essentially non-volatile liquid which is compatible with a particular kind of synthetic rubber. Thus, polyesters such as dioctyl phthalate and tricresyl phosphate may be useful in certain situations, or even fatty oils or other types of oily materials of which many are known to be compatible with common synthetic rubbers. In the preferred group of petroleum oils, there are paraffinic, naphthenic, and aromatic oils available in various ranges of boiling point and viscosity and with or without naturally occurring congeners such as oily nitrogen compounds or sulfur compounds. We prefer to use the same oils now commonly used in synthetic rubber oil masterbatches.

The reinforcing pigments generally used are the fine particle reinforcing types of carbon black, including channel black, high abrasion furnace black (HAF), super abrasion furnace black (SAF), and intermediate super abrasion furnace black (ISAF). Semi reinforcing furnace black (SRF) and fast extrusion furnace black (FEF) may also be used, but the coarse particle blacks are not of much value in this invention. If black color is undesirable, the ultra fine particle silica and similar mineral pigments may be used, but are at present somewhat more expensive. In addition, fine particle polymers are available, having reinforcing properties, and may be useful as reinforcing pigments in this invention.

The vulcanizing ingredients may be any materials capable of cross-linking the particular synthetic rubber used. In the case of diene rubbers, sulfur together with a little zinc oxide, stearic acid or a similar fatty acid, and a vulcanization accelerator, are generally most convenient. With chemically saturated rubbers such as polyethers, a peroxide such as dicumyl peroxide is generally used. In any case, any suitable vulcanizing agents may be used, including even irradiation in some situations. In addition, it is generally desirable to include an antioxidant such as phenyl-beta-naphthylamine and an antiozonant such as N-phenyl N'-isopropyl p-phenylene diamine.

As to proportion, not much saving in cost will be obtained over compositions now in use unless the oil is present in an amount at least about equal in weight to the rubber. Moreover, processing and shaping of the composition in producing the final product will be excessively difficult if less oil is present. As the molecular weight increases, the amount of oil can be increased so that a rubber of DSV 10 can be mixed with about twice its weight of oil.

The carbon black should then be about half or somewhat more than half the weight of the rubber plus oil, or in the approximate range of 40 to 70 parts for 100 parts by weight of rubber plus oil. Actually, it is relative volumes that are important. Since the density of carbon is about 1.8 while that of most rubbers and oils is between 0.9 and 1, it comes out that the volume of carbon black in properly reinforced tire treads and similar compositions is about 20 to 35 or 40 volumes of carbon black for 100 volumes of rubber plus oil. This same volume proportion applies if other reinforcing materials such as mineral pigments are used.

The vulcanizing ingredients do not react appreciably with neutral oils, but do dissolve in them to some extent. Consequently, it is not ordinarily feasible to reduce the amount of vulcanizing ingredients in the proportion that the rubber is reduced by virtue of its dilution with oil. On the other hand, a considerable saving is possible over the amount which would be required to vulcanize rubber if it occupied the entire volume between carbon black particles without any oil being present. The optimum amount is best determined in each case by some preliminary trials.

It is possible to add neutral oils and carbon black to the monomers before they are polymerized. However, since it is not feasible to add all ingredients of the final composition at that time because of intereference with the polymerization, it is about as convenient to do all the mixing after polymerization is complete.

If the carbon black and other additives do not disperse easily in the water or solvent in which the rubber polymer is dispersed, they should be dispersed in a small volume of the water or solvent before addition to the rubber, as is conventional in making up such mixes. After all the ingredients are added, they are thoroughly and uniformly mixed, and the mix is then separated from the water or solvent by conventional procedures such as drying of a solution mix or coagulation, washing, and drying of a latex mix.

It is even possible to commence the separation from the dispersion medium before mixing in some or all of the ingredients of the rubber mix. Thus, a rubber latex may be coagulated to form a suspension of flocs or fine crumbs. Some or all of the non-rubber ingredients may then be mixed with the wet crumbs of coagulated rubber without degradation in properties, since the original latex particles tend to be loosely agglomerated so that either liquid or solid materials can be brought into intimate and thorough admixture without significant working of the rubber and without appreciable rupture of polymer chains. The dewatering can then be completed in any convenient manner such as by squeezing and drying.

When a synthetic rubber of the kind specified above is compounded in a liquid condition with a large quantity of oil and a suitable proportion of carbon black based on the sum of rubber and oil, along with the usual vulcanizing and protective materials, and is shaped to the form of a tire tread without further mixing, followed by vulcanization, a number of surprising benefits are observed.

First, the cure rate is increased over that observed when the same quantities of materials are conventionally mixed in the absence of a dispersion liquid, which means that a reduced quantity of expensive vulcanization accelerator can be used to attain a given state of vulcanization in a prescribed time.

More importantly, the performance of the tire tread is increased in several particulars over tire treads of similar composition prepared by conventional dry mixing of vulcanizing ingredients, without loss of any desirable property. The resistance to abrasive wear is significantly increased. The resistance to slippage, both on dry and wet surfaces is significantly increased. The strength of the product is increased. Its heat generation during flexing is reduced.

These benefits permit the preparation of a higher quality product, or of an equally good product at a substantially lower cost if a particularly high proportion of inexpensive oil is used, or sometimes both.

If the compositions of this invention, prepared as described above by wet mixing, are further mechanically mixed in a dry state, these benefits are rapidly lost. Only a few passes through an ordinary 2-roll mixing mill adjusted for a mixing operation, such as for mixing vulcanizing ingredients into a rubber-oil-black masterbatch, noticeably degrade the material, so that after a thorough dry mixing its properties are no better than if it had been entirely prepared by dry mixing. On the other hand, a simple shaping operation such as sheeting the composition between a suitably adjusted pair of rolls, or extrusion with a machine designed to avoid mixing, to produce an appropriate shape for a preform for molding of for vulcanization in the same shape, will not have a significant detrimental effect.

Although tire treads are considered to be most important field of use of this invention, the same kind of composition can be used for many other purposes without change, or with minor changes in choice of ingredients and proportions to adapt the composition to various special requirements. Such uses include conveyor belt covers, hose covers, shoe soling, abrasion protectors for grinding mills and chutes, and many other products.

Example 1

As a control, a typical tire tread composition of highest quality was selected, containing 50 parts by weight each of a cis 1,4 polymer of butadiene (CB) and of a copolymer of about one-fourth styrene and three-fourths butadiene (SBR); 85 parts reinforcing carbon black; 60 parts petroleum oil; and the usual small quantities of vulcanizing agents, namely sulfur, zinc oxide, stearic acid and a vulcanization accelerator; and protective materials, namely an antioxidant and antiozonant. This composition was given a preliminary mechanical mixing in a Banbury mixer, finished by mixing on a two-roll mixing mill, and then was shaped and vulcanized by heating under pressure in a mold.

Two synthetic rubbers were prepared by polymerizing a mixture of about one-fourth styrene and three-fourths butadiene, in solution, under conditions known to produce a uniform polymer of high molecular weight. One of them was found to have a DSV of 3.83 and an R value or polydispersity of 1.18. While still in solution, a portion containing 100 parts by weight of the rubber polymer was thoroughly mixed with 110 parts reinforcing carbon black and 90 parts petroleum oil, and another portion of 100 parts was mixed with 135 parts reinforcing carbon black and 115 parts petroleum oil. The other rubber had a DSV of 9.02 and an R value of 2.26. A portion containing 100 parts of the rubber was mixed with 155 parts reinforcing carbon black and 137.5 parts petroleum oil, and another portion of 100 parts was mixed with 180 parts reinforcing carbon black and 165 parts petroleum oil. To each of the four mixtures were also added the usual small quantities of vulcanizing and protective materials, and after thorough mixing the compositions were recovered from the solutions by evaporation of the solvent. Each was then shaped by cold pressing and was vulcanized by heating under pressure in a mold.

The four vulcanized products just mentioned were compared with the control product. In every respect measured the last mentioned four products were equal or superior to the dry mixed control composition. The static and sliding coefficient of friction and cornering ability were consistently greater, and in particular the high speed peak coefficient was 10% to 30% higher than the control on a typical pavement surface consisting of wet Dorset pebbles.

Wear resistance was equal but the material cost on an equal volume basis was much lower, ranging from 88% of the control for the first of the four, with the lowest proportion of oil, to 75% of cost of the control for the fourth, having the highest proportion of oil.

Example 2

Two solution polymers were prepared from one-fourth styrene and three-fourths butadiene, but one was made to a low molecular weight, with DSV 2.28 (below the range of this invention) and the other to a high molecular weight, with a DSV 7.73 and an R value or polydispersity of 1.55. Two portions of each of the two rubber polymer solutions were measured out, each containing 100 parts by weight of polymer, and the four portions were compounded as follows. The two portions of the DSV 2.28 rubber were each mixed with 65 parts petroleum oil. One was dried and mixed in a Banbury mixer with 90 parts reinforcing carbon black, and then the vulcanizing and protective ingredients were mixed into the dry mix on a two-roll mixing mill. The other was mixed with the same quantities of the same ingredients while still in solution, and was then dried. The two portions of the DSV 7.73 rubber were similarly mixed, one mixed entirely in solution, and the other finished by Banbury mixing and roll mill mixing as described above, except that 160 parts oil and 175 parts black were used. All four were cold pressed and vulcanized by heating under pressure in a mold.

The two mixes made from the 2.28 DSV rubber had nearly the same Mooney viscosity, whereas the mix prepared entirely in solution from the 7.73 DSV rubber had a very much higher Mooney viscosity than the dry mix. The two mixes made from the 2.28 DSV rubber and the dry mix made from the 7.73 DSV rubber had essentially the same extrusion rate, whereas the solution mix of the 7.73 DSV rubber surprisingly had a 25% higher extrusion rate. The two vulcanized products made from the 2.28 DSV rubber had comparable abrasion index and temperature rise on rapid flexing, with the solution mixed product apparently slightly worse, whereas the product mixed entirely in solution from the 7.73 DSV rubber was much superior to the dry mixed product in abrasion index and exhibited a much lower temperature rise on flexing. In other respects the 7.73 DSV rubber when compounded by wet mixing as described above was at least equal to the dry mixed product.

It is apparent that the wet mixing procedure does not produce better results than dry mixing unless the synthetic rubber has the particular properties herein specified. Accordingly, the unexpected results obtained by the practice of this invention cannot be explained by the superior carbon black dispersion achieved by wet mixing.

It is likewise apparent that the particular rubbers herein specified do not lead to improved results unless compounded essentially without dry mechanical mixing. It is, accordingly, an important feature of this invention that mechanical mixing be avoided except to the limited extent required for shaping in preparation for final vulcanization of the product.

The foregoing data are typical of many results which uniformly indicate that vulcanized rubber products of equal or better properties than those heretofore known are obtained by the practice of this invention, with substantial savings in material costs. These results have been verified by road tests of pneumatic tires with treads of the new compositions of this invention, with results equal to those of standard production tires run at the same time as a control notwithstanding the much higher proportions of cheap oil present in the treads of this invention.

We claim:

1. The process of preparing a pigment-reinforced synthetic rubber article, which process comprises mixing:
   (a) unvulcanized synthetic rubber having a polydispersity value not over 2.5 and a DSV more than twice its polydispersity value, which synthetic rubber is dispersed in a liquid medium,
   (b) oil compatible with the rubber in a quantity at least about equal to the rubber,
   (c) a reinforcing carbon black pigment in a volume of about 20 to 40 parts for 100 volumes of rubber plus oil,
   (d) all other ingredients,
the mixing being carried out while the rubber is in the liquid medium, separating the rubber mix from the liquid medium, shaping it to form an article without mechanical working other than that required for shaping, and vulcanizing the shaped article.

2. A process as in Claim 1, in which the rubber has a DSV of at least 3.5.

3. A process as in Claim 2, in which the rubber is dissolved in a volatile solvent and the separation is by evaporation of the solvent.

4. A process as in Claim 3, in which the rubber is a copolymer of a major proportion of butadiene and a minor proportion of styrene.

References Cited

UNITED STATES PATENTS

| | | | |
|---|---|---|---|
| 3,655,599 | 4/1972 | Kay et al. | 260—33.6 AQ |
| 3,654,214 | 4/1972 | Beckman | 260—33.6 AQ |
| 3,231,635 | 1/1966 | Holden | 260—28.5 B |
| 3,265,765 | 8/1966 | Holden | 260—28.5 B |
| 3,676,387 | 7/1972 | Lindlof | 260—33.6 AQ |
| 3,434,994 | 3/1969 | Smit | 260—33.6 AQ |

OTHER REFERENCES

G. G. Winspear: "The Vanderbilt Rubber Handbook," R. T. Vanderbilt Co., New York, 1958, p. 165.

MORRIS LIEBMAN, Primary Examiner

P. R. MICHL, Assistant Examiner

U.S. Cl. X.R.

152—330; 260—33.6 A, 41.5 R